May 21, 1935.  E. ROBERTS  2,002,478
TRANSMISSION CLUTCH
Filed Oct. 17, 1932
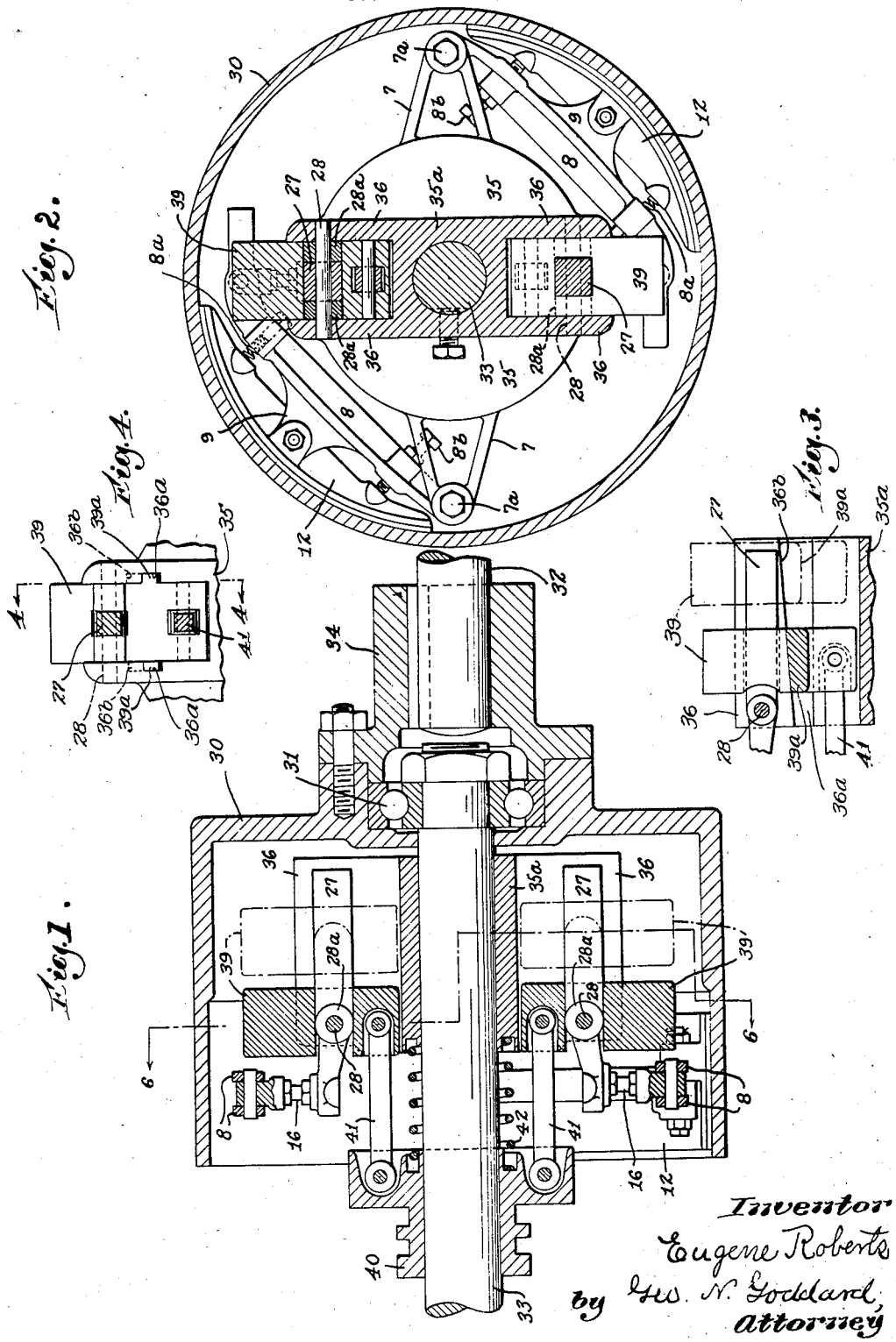
Inventor
Eugene Roberts
by Geo. N. Goddard,
Attorney Patented May 21, 1935

2,002,478

UNITED STATES PATENT OFFICE 2,002,478

TRANSMISSION CLUTCH

Eugene Roberts, Hastings, N. Y., assignor to The Western States Machine Company, Salt Lake City, Utah, a corporation of Utah Application October 17, 1932, Serial No. 638,057

11 Claims. (Cl. 192—105)

This invention relates to clutches and is particularly intended for use in motor cars or the like wherein it is preferred to employ a friction clutch, that is normally maintained in active position when the motor shaft is running, and yet which may be easily shifted from active position to inactive position whenever it is desired to throw out the clutch. The present clutch is in the nature of an improvement on an earlier form of clutch set forth in my copending application for Letters Patent of the United States, issued October 25, 1932, No. 1,884,873 and is intended to utilize some of the features present in my said earlier clutch with such additional features as particularly adapt it to kinds of service similar to that of a motor car driving clutch.

One of the distinctive features of the present clutch resides in the application of the centrifugal principle to throw the clutch out of active driving engagement, as well as to maintain it in its active driving position. This and other features of the invention will be particularly described in the following specification and will be defined in the claims hereto annexed.

In the accompanying drawing I have illustrated a simple and convenient embodiment of the present invention, in which Fig. 1 is a central section coincident with the axis of the transmission shafts.

Fig. 2 is a tranverse section taken on the offset plane indicated by the broken line of Fig. 1, viewed in the direction indicated by the arrows at the end of said section-indicating line.

Fig. 3 is a detail view showing means for limiting the retracting movement of the lever 27 when the weight is at its outermost position and for relieving the lever from the outward thrust of the counterbalance weight when the latter is at its inner or neutral position on the plane 4—4 of Fig. 4.

Fig. 4 is an end elevation of the spider and counterbalance weight provided with the splines and grooves for guiding the counterbalance weight.

As illustrated in the drawing, the transmission pulley 30 is loosely mounted upon the drive shaft 33 by means of an antifriction bearing 31 and is coupled to the driven shaft 32 by a splined coupling member 34, the two shafts being in axial alignment.

Fast on the drive shaft 33 is secured a spider comprising a disc-like or circular member 35 with an axially extending cross-head member 35ª of oblong form extending transversely of the disc 35 and provided at its opposite ends with deep axially extending recesses to form runways or guideways between the lateral bounding walls 36 for a pair of slidable weights 39.

At the disc-like or spider end of this carrier element 35, 35ª are oppositely projecting arms 7 which, at their outer ends, form fulcral bearings for the forward ends of pivotal arms 8. Intermediate of each pivotal arm there is pivotally mounted an arcuate clutch shoe 12. A stop screw 8ᵇ on the side next the fulcrum of the arm 8, serves to limit the inward pivotal movement of the shoe 12 on its axis, while a compression spring 8ª, interposed between the rear portion of the arcuate shoe and its supporting arm 8, serves to press the rear end of the shoe yieldingly outward as far as the adjustment of the screw 8ᵇ will permit. As in my earlier form, this is intended to insure contact of the rear end of the shoe with the rim of the clutch pulley 30 before the forward end engages the pulley rim.

To retract the brake shoes from contact with the pulley rim I provide an extensible retracting link 16, which is pivotally connected to the rear end of the shoe-carrying arm 8 and has its inner end forming a flexible joint with the short arm of a retracting lever 27, which is fulcrumed on a transverse fulcral pin 28 supported in the opposite side walls 36 of the carrier cross-head. The long arms of the retracting levers 27 are extended on the opposite side of the fulcrum 28 from the retracting link 16 in substantial parallelism with the axis of the shaft 33. An oblong weight 39 is provided with a medial perforation or aperture extending in an axial direction and having the contour to fit loosely around the lever 27, so that said weight may slide or travel axially along said lever 27. Moreover, in order to permit the weights 39 to move to substantially dead center position with reference to the fulcral axis 28, that face of each weight adjacent to the retracting link 16 is recessed clear across for about half of the axial thickness of the weight to permit the weight to move to dead center position shown in Fig. 1. Spacing washers 28ª are also mounted on the fulcral pins 28, as shown in Fig. 2, and may serve in part as antifriction rollers to facilitate the easy travel of each weight along its supporting lever. When the weights are at dead center position (Fig. 1) they are neutral so far as acting upon their respective levers 27 is concerned, but when the weights are slid axially into dotted line position their centrifugal force is sufficient to overbalance the weight of the friction shoes and their carrying arms, and consequently the weights in their outer positions act to automatically retract the arms 8 and thus withdraw the arcuate friction shoes 12 from clutching engagement with the pulley rim.

This sliding movement of the centrifugal or shoe retracting weights is effected by means of links 41 pivotally connected with the respective weights at one end and at the opposite end pivotally connected with the shipper sleeve 40, which may be operated by foot or hand treadle.

A compression spring 42, interposed between the fixed hub or spider 35ª and the shipper sleeve 40, tends to maintain the shipper sleeve and its interconnected weights 39 remote from the spider, except as controlled by the shipper, and thus retain the weights normally in inactive or neutral position, allowing the clutch shoes and their carrying arms complete freedom of movement under centrifugal action due to the rotation of the drive shaft and thus form clutching or driving engagement with the pulley which transmits the rotary movement of the drive shaft and spider to the driven shaft 32 by means of the connecting coupling member 34. The range of movement permitted is sufficient to allow the clutch weights to move outward from the fulcral points a sufficient distance to quickly overcome the counter-centrifugal force exerted by the clutch shoes and their supporting arms. At intermediate points the weights will exert less counteracting force and thus lighten or weaken the pressure of the clutch shoes against the pulley, so that the clutching action can be eased up to any desired extent according to their different positions from the fulcral axis of their supporting levers. The side walls 36 of the weight block runways serve to relieve the levers 27 from side stresses due to the inertia of the revolving weights which they carry, while side stresses on the short arms of the levers 27 are relieved because of the fact that the shoe-carrying arms 8 transmit this thrust to the fulcral pins 7ª carried by the spider arms 7, which arms are rigid with the spider and with the driving shaft.

The action of the clutch shoes is exactly similar to that set forth in my aforesaid copending application. The instant the drive shaft begins to turn the clutch shoes, when released, are thrown centrifugally into clutching engagement with the pulley rim, the strength of the clutching action varying according to the speed of the drive shaft. By merely shifting the weights slightly away from the neutral position by the clutch treadle against the pressure of the spring 42, the clutching action may be eased up and no matter what the speed of the drive shaft may be the action is very easily effected by reason of the fact that it is not necessary to overcome powerful centrifugal force by means of the clutch pedal but merely to slide the weights axially to a position where, on account of their increased leverage, they act automatically to weaken the force of engagement between the clutch shoes of the pulley or to disengage them entirely, all with a minimum of effort on the part of the attendant or operator.

While the above described movement of the weights to dead center position serves to neutralize or eliminate at that point the outward centrifugal thrust of the weights so far as concerns the rocking of the levers 27 is concerned, yet in view of the fact that the entire stress is exerted upon the fulcral pins 28 I have preferred to provide additional means for relieving the retracting levers 27 from the thrust of the counterbalance weights when it is desired to have the clutch shoes exert their maximum pressure against the surrounding rim of the driven member. This feature is best shown in Fig. 3 and in Fig. 4. With this object in view I provide on each side of the weight 39 a laterally projecting spline or key 39ª, which projects into grooves 36ª formed in the inner faces of the retaining walls 36 of the spider structure. The upper wall or surface 36ᵇ of each groove 36ª is inclined upwardly toward the portion farthest from the fulcral axis 28 and these inclined faces are so located that when the weight is in its innermost or neutral position the upper face of each spline or flange 39ª engages the overhanging face 36ᵇ of the groove and thus sustains wholly the outward centrifugal thrust of the counterbalance weight. The lever-receiving aperture through the weight 39 has sufficient depth radially to loosely fit over the lever 27 to permit a slight play. Hence, in the position shown in Fig. 3 the entire outward thrust of the weight 39 is sustained by the flanges or splines 39ª while the clutch-shoes remain in clutching position with their full centrifugal thrust exerted against the surrounding rim.

On the other hand, as the weight 39 slides toward its outermost position its gradual outward movement from the axis is permitted by the upward inclination of the surface 36ᵇ until the weight engages the lower surface of the lever 27, thereby partly counterbalancing the centrifugal action of the clutch-shoes. Further outward movement of the weight 39, owing to increased leverage, tends to rock the retracting levers 27 and thereby retract the clutch-shoes entirely from engagement with the rim. Nevertheless, this retracting movement of the lever 27 is limited by the resistance of the inclined surface 36ᵇ to further outward movement of the weight, so that this spline and groove connection serves not only to relieve the retracting lever from any outward counterbalancing thrust of the weight when the weight is in its innermost or neutral position, but also acts as a stop to limit the outward movement of the weight when it has reached overbalancing position near the outer end of the retracting lever 27. A further advantage of this spline and groove construction is that it renders more easy the manipulation of the weight to and fro along its retracting lever 27, because of the cam-like action of the inclined plane.

What I claim is:

1. A centrifugal clutch for releasably coupling a drive shaft with a driven pulley, embracing a spider fast on the drive shaft, shoe-carrying arms pivotally connected to the spider, each arm carrying a pivotal clutch-shoe movable by centrifugal force into clutching engagement with the surrounding rim of the driven pulley, manually controllable retracting means including a pivoted lever, one of whose arms has retracting connection with said shoe-carrying arm, and a centrifugally acting counterweight arranged to exert a counterbalancing thrust on the retracting lever to weaken or overcome the centrifugal force actuating the brake shoe to its active position according to the distance of the counterbalancing weight from the fulcral point of the retracting lever.

2. A centrifugal clutch for releasably coupling a drive shaft with a driven pulley, embracing a spider fast on the drive shaft, shoe-carrying arms pivotally connected to the spider, each arm carrying a pivotal clutch-shoe movable by centrifugal force into clutching engagement with the surrounding rim of the driven pulley, retracting means including a pivotal lever, one of whose arms has retracting connection with the adjacent shoe-carrying arm, and a centrifugally actuated counterweight having slidable engagement with said retracting lever to permit its adjustment to position to centrifugally overbalance and retract the clutch-shoe or to weaken the centrifugal pressure thrusting said clutch-shoe against said rim.

3. A centrifugal clutch for coupling a drive shaft and a driven pulley, embracing a spider fast on the drive shaft, centrifugally actuated clutch-shoes having pivotal connections with said spider to cause their revolution therewith while permitting them to move outward into clutching engagement with the surrounding clutch rim of the driven pulley, retracting means operable at will comprising levers fulcrumed on the spider and interconnected with the clutch-shoes and counterbalancing weights having sliding connection with said levers to produce complete or partial counterbalancing of the centrifugal force that tends to engage the clutch-shoes with the said rim.

4. A centrifugal clutch for coupling a drive shaft with a driven pulley embracing a spider fast on the drive shaft, said spider being provided with runways extending lengthwise of the shaft, centrifugally actuated clutch-shoes having pivotal connections with said spider to cause their revolution therewith and permit their engagement under centrifugal force with a surrounding rim of the driven pulley, retracting levers fulcrumed on said spider to move about axes transverse to the axis of the drive shaft, one end of each lever being provided with connections for retracting the adjacent clutch-shoe, a counterbalance weight mounted in said runway and having sliding engagement with the other end of said lever to exert a counterbalancing force on the lever according to its distance from the lever fulcrum, and means operable at will for shifting the counterweights along their respective levers to effect complete or partial overbalancing of the centrifugal force that engages the clutch-shoes with said rim.

5. A centrifugal clutch for releasably coupling a drive shaft with a driven member embracing in its construction a spider fast on the drive shaft, centrifugally actuated clutch-shoes pivotally connected with said spider, retracting levers fulcrumed on the spider to permit oscillation in a plane transverse to the plane of movement of the clutch-shoes, a counterbalancing weight slidably mounted on each of said levers and having engagement with guideways formed in said spider, said counterweights being movable into dead center position with respect to the fulcral axis of its supporting lever to neutralize their centrifugal force, means normally tending to retain said counterweights in such neutral position, and means operable at will while the clutch is running to move said counterweights to any desired distance from said fulcral axes to exert an overbalancing centrifugal force through said levers and thereby retract the clutch-shoes from engagement with said rim.

6. A transmission clutch for coupling a drive shaft with a driven member embracing a spider fast on the drive shaft, centrifugally actuated clutch-shoes interconnected with said spider to permit their movement into engagement with a surrounding rim of the driven member under their centrifugal force, retracting levers fulcrumed on the spider and having retracting connections for withdrawing the clutch-shoes from said rim, counterbalance weights for said levers movable in guideways in said spider, and means operable at will for shifting said weights to different distances from the fulcral axes of said levers to weaken or to overcome the clutching engagement of the shoes with the rim according to the distance of the weights from said fulcral points.

7. In a clutch having centrifugally actuated clutch-shoes carried by a revolving spider, the combination of shoe-retracting levers fulcrumed on the spider, centrifugally acting counterweights having sliding engagement with the retracting levers to overbalance the clutch-shoes when the weights are moved outward on said levers, and guides slidably engaged by the weights to permit the weights to have movement obliquely of the axis of revolution as they are shifted to overbalancing position.

8. In a clutch having centrifugally actuated clutch-shoes interconnected with a revolving spider, the combination of shoe-retracting levers fulcrumed on the spider, centrifugally acting counterweights having slidable engagement with the retracting levers to overbalance the clutch-shoes when moved outward along said levers, the weights having sliding engagement also with inclined surfaces of the spider to relieve the retracting levers at the inactive position of the weights from the outward thrust of the weights while permitting the weights to exert an outward thrust on their levers as the weights are shifted to overbalancing position.

9. In a clutch having centrifugally actuated clutch-shoes carried by a revolving spider, the combination of shoe-retracting levers fulcrumed on the spider, centrifugally acting counterweights having sliding engagement with guiding surfaces of the spider arranged to prevent outward thrust of the weights against the levers when the weights are adjacent the fulcral axes of the levers while permitting the weights to exert an outward counterbalancing thrust against the levers to retract the shoes when the weights are shifted away from said fulcral axes to counterbalancing position.

10. In a clutch having centrifugally actuated clutch-shoes pivotally connected with a revolving spider, the combination of shoe-retracting levers separately fulcrumed in said spider, and centrifugally actuated counterweights having sliding engagement with said levers to permit their adjustment a sufficient distance from the fulcral axes of the levers to overbalance the clutch shoes, and means operable at will for shifting said weights to and from overbalancing position.

11. A centrifugal clutch for coupling a drive shaft with a driven pulley embracing a spider fast on the drive shaft, centrifugally actuated clutch shoes pivotally connected with said spider for movement about pivotal axes parallel to the axis of the spider to cause them to revolve around the shaft axis while permitting them to frictionally engage the surrounding clutch rim of the driven pulley, retracting means for disengaging said shoes from driving engagement with said rim, said retracting means including centrifugally actuated counterweights shiftable in the axial direction of the shaft to counteract, in desired degree, the centrifugal force that tends to engage the shoes with the rim, and means operable while the clutch is running for shifting the said counterweights to and from overbalancing position.

EUGENE ROBERTS